(12) United States Patent
Lesea

(10) Patent No.: US 8,146,028 B1
(45) Date of Patent: Mar. 27, 2012

(54) DUPLICATE DESIGN FLOW FOR MITIGATION OF SOFT ERRORS IN IC OPERATION

(75) Inventor: Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 634 days.

(21) Appl. No.: 12/274,261

(22) Filed: Nov. 19, 2008

(51) Int. Cl.
*G06F 17/50* (2006.01)

(52) U.S. Cl. ............ 716/104; 716/55; 716/111; 716/116

(58) Field of Classification Search .................... 716/55, 716/104, 111, 116
See application file for complete search history.

(56) References Cited

U.S. PATENT DOCUMENTS

| | | | |
|---|---|---|---|
| 4,719,629 A | 1/1988 | Wang | |
| 6,035,416 A | 3/2000 | Abdelnour et al. | |
| 7,028,281 B1 * | 4/2006 | Agrawal et al. | 326/41 |
| 7,143,329 B1 | 11/2006 | Trimberger et al. | |
| 7,254,800 B1 | 8/2007 | Trimberger | |

OTHER PUBLICATIONS

U.S. Appl. No. 12/264,283, filed Nov. 4, 2008, Sundararajan et al.
Wikipedia, "Dual modular redundant," *Wikipedia*, Aug. 7, 2006, accessed May 13, 2009, <http://en.wikipedia.org/w/index.php?title=Dual_modular_redundant&action=edit&oldid=68178398>.
Curd, Derek R., "Single Event Upset (SEU) Detection and Correction in Virtex-II Pro Devices," XAPP673 (v.1.0.1), Aug. 27, 2003, pp. 1-12, available from Xilinx, Inc., 2100 Logic Drive, San Jose, California 95124, USA.
Miller, Greg et al., "Single-Event Upset Mitigation for Xilinx FPGA Block Memories," XAPP962 (v.1.1), Mar. 14, 2008, pp. 1-19, available from Xilinx, Inc., 2100 Logic Drive, San Jose, California 95124, USA.

* cited by examiner

*Primary Examiner* — Thuan Do

(74) *Attorney, Agent, or Firm* — Scott Hewett; LeRoy D. Maunu

(57) ABSTRACT

An integrated circuit ("IC") (100) is configured to have two instantiations of a user design (103, 105). Register values from the first instantiation (RA1, RA2, RA3, RA4) are compared (102) to corresponding registers of the second instantiation (RB1, RB2, RB3, RB4). If a register pair does not match, the user designs are halted, re-loaded, and re-started.

16 Claims, 5 Drawing Sheets

US 8,146,028 B1

DUPLICATE DESIGN FLOW FOR MITIGATION OF SOFT ERRORS IN IC OPERATION

FIELD OF THE INVENTION

This invention relates generally to integrated circuits ("ICs"), and more particularly to configuring circuits in an IC for improved immunity to logic or memory upset events.

BACKGROUND OF THE INVENTION

Successful execution of IC functions relies on both the memory and logic operating as intended. If a memory cell, latch, or flip-flop is upset (i.e., flipped from one digital state value to the opposite digital state value), such as by a cosmic ray, heavy ion, or electronic noise, the result is an error in the functionality of the IC that is commonly referred to as a "soft error".

For critical applications, where a soft error might result in a catastrophic failure, XILINX, INC., of San Jose, Calif., has developed techniques and tools commonly referred to as "triple modular redundancy" ("TMR"). TMR basically uses three versions of a circuit, operates the circuits in parallel, and compares the three outputs. If all three outputs are the same, that output value is accepted. If only two of the outputs are the same, the assumption made is that the third output arose because of a soft error in either the memory or logic of that circuit. The value used is the common value between the two outputs, and the uncommon value is basically discarded (although error logging may optionally be performed).

Tools have been developed to implement TMR in configurable ICs, such as field-programmable gate arrays ("FPGAs"). A typical TMR tool creates functionally correct logic in electronic design interchange format ("EDIF") suitable for use with automatic place and route tools. An automatic place and route tool selects the physical resources of the FPGA that will make up the triple redundant circuits and produces a configuration file (data stream), that, when programmed into the FPGA, configures the FPGA for the intended application.

While TMR techniques are highly valuable for real-time soft error mitigation, such techniques consume substantial on-chip resources. Therefore, soft error mitigation techniques that consume less on-chip resources are desirable.

SUMMARY OF THE INVENTION

An IC is configured to have two instantiations of a user design. Register values from the first instantiation are compared to corresponding registers of the second instantiation. If a register pair does not match, the user designs are halted and the error is corrected.

DETAILED DESCRIPTION

Figure 1A:
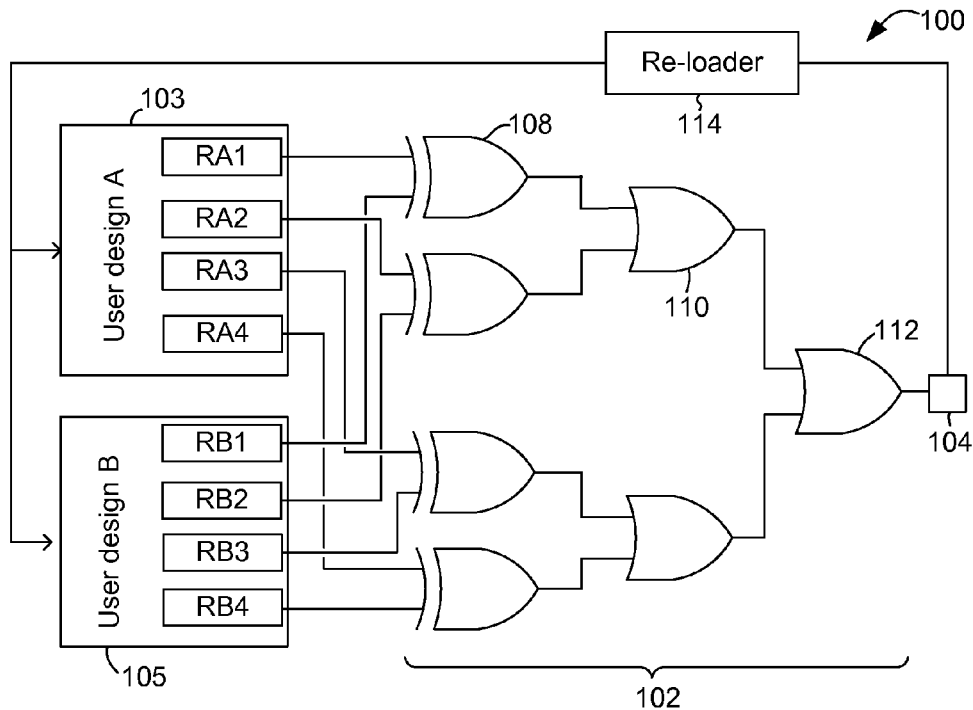
FIG. 1A is a diagram of a portion of an IC with a doubly redundant circuit using a comparator cone according to an embodiment.

FIG. 1A is a diagram of a portion of an IC with a doubly redundant circuit 100 using a comparator cone 102 according to an embodiment. The circuit 100 has a first set of registers RA1, RA2, RA3, RA4, from a first instantiation of an user design 103 and a second set of registers RB1, RB2, RB3, RB4 from a second instantiation of the user design 105. The second instantiation is essentially a duplicate of the first instantiation, and therefore the values in the first and second registers match if each user design is working properly. The user design is a circuit (application) defined in a high-level design language, such as VERILOG or VHDL, and synthesized into the architecture of the IC. If all the register pairs (e.g., RA1 compared to RB1, RA2 compared to RB2, etc.) match, the comparator cone 102 produces a VALID signal at comparator cone output 104. A typical IC according to an embodiment might have tens or hundreds of thousands of register pairs. Only four are shown in FIG. 1A for simplicity and clarity of illustration.

If a soft error occurs in either of the duplicate user designs (e.g., either a data value stored in a memory cell or a logic value stored in a flip-flop or other logic element is flipped (generally referred to as a "bit flip")), such that any one of the register pairs does not match, the comparator cone produces an INVALID signal at comparator cone output 104. Since it is highly unlikely that both registers of a register pair will be simultaneously flipped, an INVALID signal is taken to indicate that a soft error has occurred. While an INVALID signal is generated if any one of the register pairs does not match, an INVALID signal would also be generated if multiple register pairs did not match.

While exclusive OR (ex-OR) gates 108 are used as the first tier of comparators in FIG. 1A and OR gates 110, 112 are used for subsequent tiers of comparators, those of skill in the art realize that any of several types of logic operators could be used to create the comparator cone, including N-by-1 logic operators where N is an integer greater than two. The output signal indicating a VALID comparison (i.e., the results of all register pairs match) could be a logical one or logical zero value, and that the values stored in a register pair could be a logical one or a logical zero. In other words, one pair of valid registers might each hold a logical one value, while another pair of valid registers each hold a logical zero value. In a particular embodiment, the registers of the first and second instantiations of the user design are compared every clock cycle during operation of the user design. Alternatively, the registers are compared at selected clock cycles, or during selected portions of operation of the user design.

The comparator cone 102 basically takes N-register pairs and produces a single result indicating if any of the register pairs did not match. In a particular embodiment, the comparator cone evaluates each register pair within a single clock cycle. That is, the register values are provided (written) to the register pairs at a clock signal edge (or other clock signal), and a VALID or INVALID output signal is detected during the clock cycle if the clock signal is longer than the delay through the comparator cone, or on the next clock cycle. Thus, the comparator cone allows continuous, near-simultaneous evaluation of the dual user designs. In a particular embodiment, the output of the comparator cone is provided in not more than three clock cycles of the user design, which in particular user designs allows the user design to be halted before an error occurring in the IC is propagated to the output of the user design.

Another advantage of using a relatively simple comparator cone is that several embodiments may be defined directly in an EDIF file without first defining the comparator cone in a high-level circuit design language and synthesizing the VHDL circuit definition to EDIF. This avoids having to re-synthesize the user designs, as is further discussed below in reference to FIG. 3.

If an INVALID condition ("mis-compare") is detected, a re-loader circuit 114 halts operation of the user and re-loads at least a portion of one or both user designs 103, 105 in the IC 100. In one embodiment, a supervisory processor is notified of a mis-compare, and the duplicate user designs are re-loaded (re-configured) from a configuration source file and the process re-started. In an alternative embodiment, error correction is performed after a mis-compare but the process continues from where it was halted. For example, an error may occur in a video display operation that disrupts a few frames of the display, but, once corrected, continues without re-starting.

In one embodiment, error correction is performed by completely re-loading both instantiations of the user design and continuing from where the process was halted, essentially as occurs during power-up. In an alternative embodiment, error correction is performed by identifying the portion of the user design that produced the invalid result and re-loading the failed portion.

In a particular embodiment, the IC is an FPGA having an internal configuration access port ("ICAP"). The ICAP allows the FPGA to access configuration ports inside the chip by basically multiplexing access terminals of the FPGA to internal nodes. The FPGA further includes an error check and correct ("ECC") feature that allows the FPGA to poll frames of the first and second user design instantiations and compare the ECC value calculated from each frame with a standard value stored for each frame. ECC is performed on both instantiations of the user design in response to a mis-compare. ECC techniques typically use a Hamming error correction code or similar error correction technique. FPGAs using ECC techniques are described in further detail in commonly owned U.S. Pat. No. 7,143,329, issued Nov. 28, 2006 to Trimberger et al., and commonly owned U.S. Pat. No. 7,254,800, issued Aug. 7, 2007 to Trimberger, the disclosures of which are hereby incorporated by reference in their entirety for all purposes.

In a particular embodiment, only one set of registers is used in the operation of the application. The second set of registers is used to monitor proper operation (i.e., to detect soft errors), but are redundant in the operation of the user design. In a particular embodiment, memory blocks of the duplicate user designs are re-loaded or corrected using ECC techniques and the process repeated. If a mis-compare occurs a second time, a hard error flag is generated.

TMR techniques are highly useful for real-time soft error mitigation, such as during the launch phase of a rocket, when continuous computational operation is critical, but use substantial on-chip resources. The additional processing time of re-loading and re-running applications in response to a mis-compare are tolerable in many high-reliability computational environments where real-time soft fault mitigation is critical. An example of such application is a financial processing server, where a mistake arising from a soft error could be very costly, but where some extra processing time is not fatal to operation of the user design.

Figure 1B:
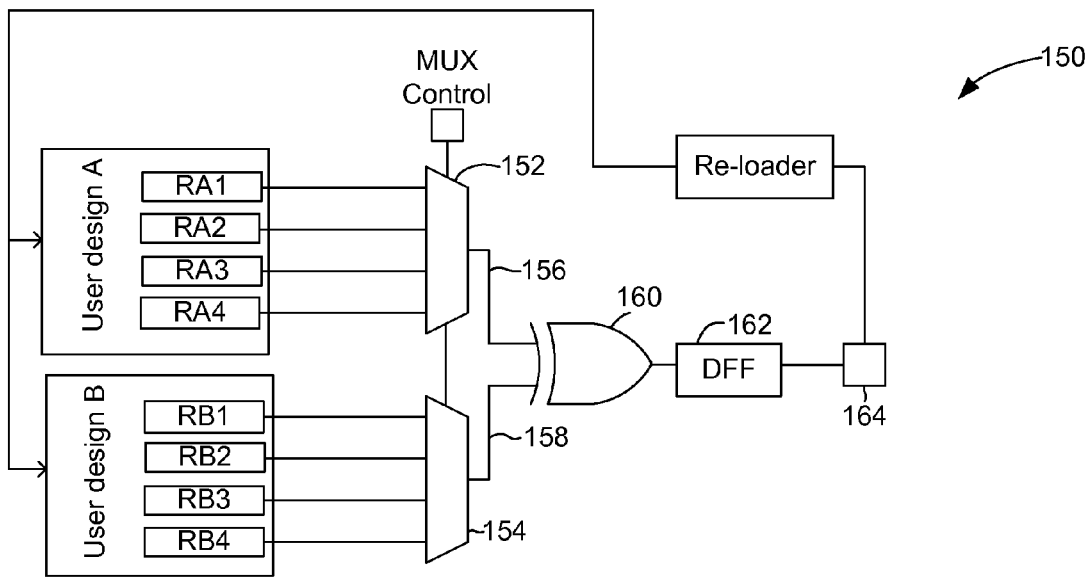
FIG. 1B is a diagram of a doubly redundant circuit using a multiplexer according to an embodiment.

FIG. 1B is a diagram of a doubly redundant circuit 150 using multiplexers 152, 154 according to an embodiment. Register pairs RA1, RB1, RA2, RB2, RA3, RB3, RA4, RB4 are compared by multiplexing the register pairs and comparing the multiplexer outputs 156, 158 in a logic operator (exclusive-OR) 160 to detect whether the register pairs match, and provide an INVALID control signal at an output 164 if any register pair doesn't match. In one embodiment, the output 164 is essentially continuously monitored and the user design 103, 105 is halted upon receipt of an INVALID control signal. In an alternative embodiment, an optional differential flip-flop 162 or latch holds any INVALID signal occurring during the multiplexing/compare sequence. In an alternative embodiment (not shown), the output 164 is OR'd with a sticky bit (not shown), which is a flip-flop that stays HI until manually re-set; thus, if the output 164 ever goes high during the sticky bit captures and holds the event.

The multiplexers take longer to determine whether a mis-compare occurs at any register pair, compared to the comparator cone of FIG. 1B; however, using multiplexers allows the user to easily determine which register pair(s) was invalid and re-configure that segment of the parallel application. Alternatively, a mis-compare initiates a complete re-configuration of an FPGA.

Figure 1C:
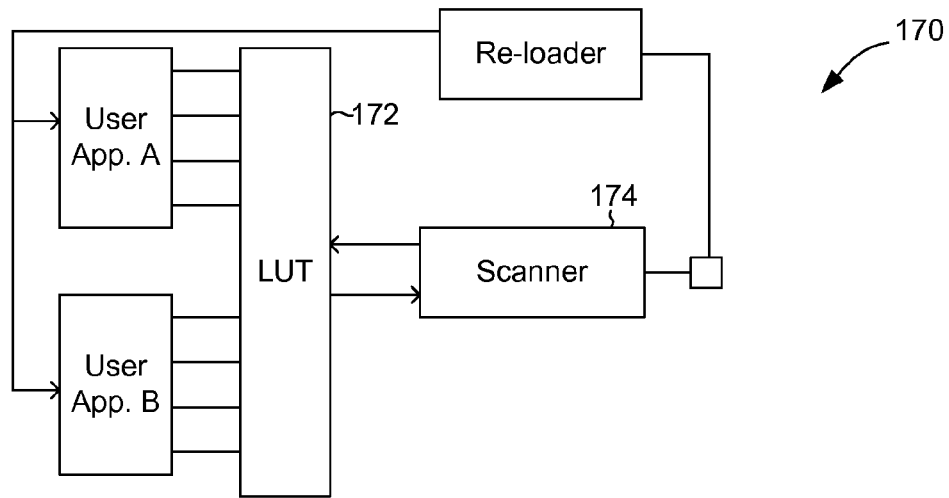
FIG. 1C is a diagram of a doubly redundant circuit using a look-up table according to an embodiment.

FIG. 1C is a diagram of a doubly redundant circuit 170 using a look-up table 172 according to an embodiment. The look-up table 172 is a X-by-N table where N is the number of rows representing the number of register pairs being evaluated and X is an integer, typically one or two. A typical application has about 10,000 register pairs to about 400,000 register pairs, depending on the circuits implemented in the FPGA; however, these numbers are merely exemplary. A scanner 174 generates an address, which is sent to the look-up table 172, and reads the address value.

In one embodiment, the look-up table 172 is a one-by-N look up table. The entries in the one-by-N look-up table are comparator results of register pairs. The scanner 174 scans the column of the look-up table for an INVALID comparison value. As with the multiplexer approach described above with reference to FIG. 1B, using a scanner and look-up table takes longer than a comparator cone, but easily identifies which register pair(s) produced the INVALID value(s). Alternatively, the look-up table is a two-by-N look-up table. One column stores values from operation of the first instantiation of the user design in a first-half of register pairs and the second column stores the values from a second-half of register pairs from operation of the second instantiation of the user design. Embodiments use separate register sets, or the values resulting from operation of the first and second instantiations of the user designs are written directly to the LUT. The scanner scans both columns and outputs an INVALID value if any of the rows of the look-up table don't match. In alternative embodiments, a look-up table uses multiple columns for one or both halves of the register pairs (i.e., N does not equal the number of register pairs), and the scanner scans the look-up table to determine whether any mis-match occurs between register pairs.

Figure 2:
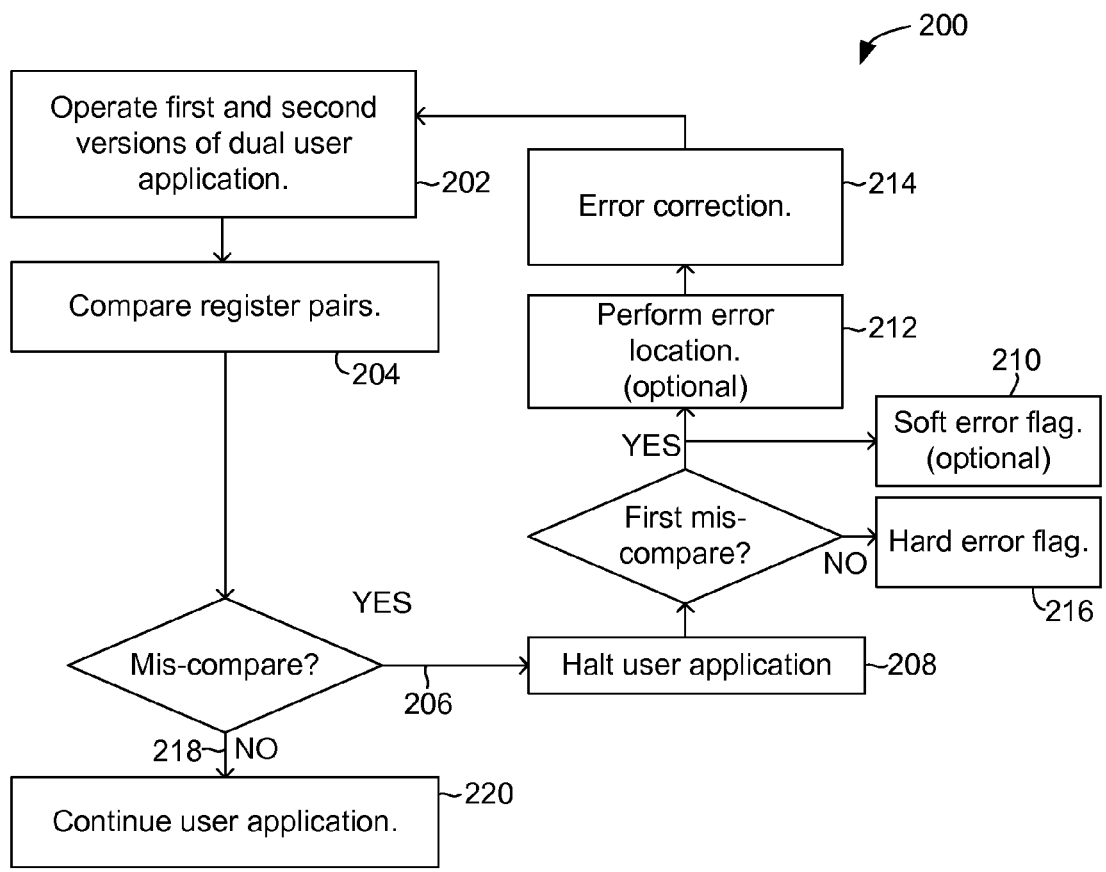
FIG. 2 is a flow chart of a method of operating an IC with soft error mitigation according to an embodiment.

FIG. 2 is a flow chart of a method of operating a circuit configured in an IC 200 with soft error mitigation according to an embodiment. A first instantiation of the circuit is operated to produce a first set of values that are held in a first set of registers and a second instantiation of the circuit is concurrently operated to produce a second set of values that are held in a second set of registers (step 202). The first set of registers forms a first half of a set of register pairs and the second set of registers forms a second half of the set of register pairs. The second instantiation of the circuit is a duplicate of the first instantiation, thus, it is expected that, absent an error, each of the first halves of a register pair will match each of the corresponding second halves. The first and second halves of each register pair are compared (step 204), and an INVALID control signal is generated if any register pair does not contain matching first and second values (i.e., a mis-compare) (branch 206). If the comparison results are INVALID, the process is halted (step 208), and soft error mitigation is attempted.

In a particular embodiment, error testing (operational comparison) is done every clock cycle to see if an error has occurred. The VALID or INVALID comparison results can be pipelined such that any mis-compare is caught early so that the operation of the IC is halted before an error is output or propagated through the user design to produce an erroneous output. Several techniques are alternatively used or combined to capture a mis-compare. For example, a sticky bit can be used to feedback an INVALID signal to the output of a comparator cone, or used in an OR operation with the output of the comparison sequence to hold (capture) a mis-compare.

An INVALID control signal is optionally reported as a soft error (step 210) and is optionally logged. Error location is optionally performed to identify the location of the mis-compare in the duplicate first and second instantiations of the circuit (step 212). Error correction is attempted (step 214). If the error is a "hard" error, i.e., an error due to a physical circuit defect, soft error correction techniques are unlikely to correct the mismatch. In an embodiment using on-chip error correction such as ECC, the frame or other portion of the user design with the error is corrected (re-loaded). In an alternative embodiment, a complete re-loading of both instantiations of the user design is performed in response to a mis-compare. In an application using an FPGA, re-loading may include re-configuration of selected circuits and components using the configuration bitstream. In an application using an application-specific IC ("ASIC"), re-loading might be limited to re-loading initial values to RAM. Re-loading is done automatically by a re-loader circuit configured in the IC. In a further embodiment, the entire first and second circuit instantiations are re-loaded similar to the configuration sequence at power-on ("wake-up"). In contrast, a scrubber circuit in a TMR technique runs continuously to insure continuous operation of the TMR IC.

In a typical IC according to an embodiment, the user design is halted for a relatively short period of time, typically on the order of about 10 milliseconds to about 100 milliseconds, while the re-loader circuit operates. Re-running the user design from the beginning to the point at which the mis-compare occurred similarly takes relatively little time, and the total time lost by using a dual modular redundancy technique according to an embodiment is an acceptable trade-off for the enhanced reliability of operational results for many IC applications. In a typical terrestrial environment, a re-load and re-start due to a mis-compare might occur on the order of once ever few days to decades; thus, techniques according to the embodiment do not significantly degrade operation of ICs where brief interruptions are tolerable.

After error correction is attempted, the first and second (re-loaded or re-configured) circuit instantiations are operated again (step 202) and a second set of register pairs are compared (step 204). If a mis-compare occurs again (i.e., the comparison of the registers pairs is INVALID) (branch 206), the user designs are halted (step 208) and a hard-error control signal is generated (step 216).

If all register pairs match (i.e., the comparison of the register pairs is VALID) (branch 218), the outputs of one or both duplicate user designs are accepted and the duplicate user designs are allowed to continue to the next step in the process (step 220). In a particular embodiment, the comparison is performed every clock cycle. In an alternative embodiment, a comparison is performed after a critical operation of the user design.

Figure 3:
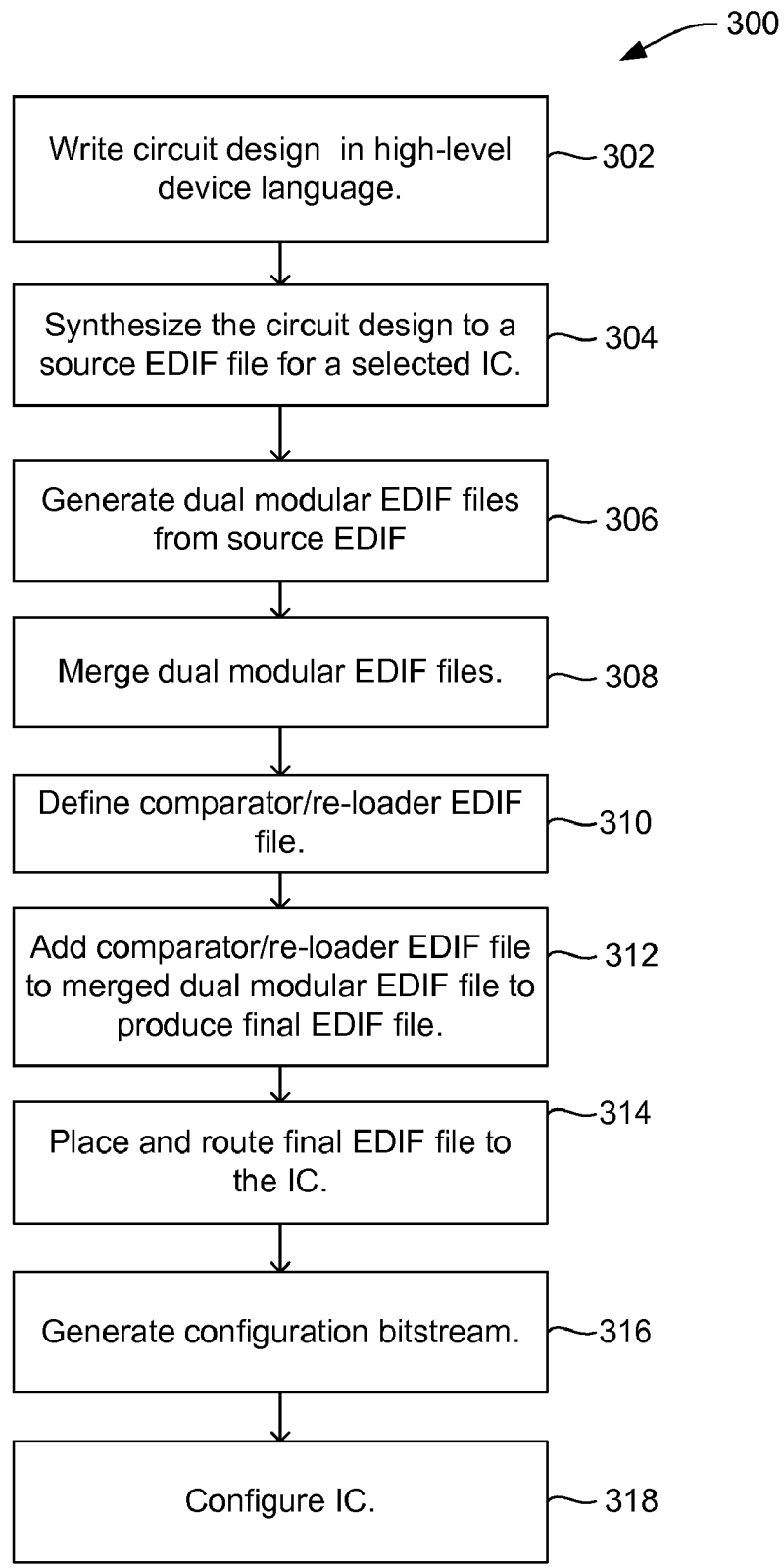
FIG. 3 is a flow chart of a method of configuring an IC according to an embodiment.

FIG. 3 is a flow chart of a method 300 of configuring an IC with soft-error mitigation according to an embodiment. A circuit design is written in a high-level device language, such as VHDL or VERILOG (step 302) and synthesized for a particular IC or IC type to produce a source EDIF file of the circuit design (step 304). In one embodiment, the IC is an FPGA. In an alternative embodiment, the IC is an ASIC. The circuit design is generally the circuit that will become the first and second user designs synthesized (configured) into the physical IC according to the device library of the IC (e.g., the FPGA or ASIC library).

A dual modular redundancy design tool according to an embodiment duplicates the source EDIF file of the circuit design into a first instantiation (user design A) and into a second instantiation (user design B). A conventional synthesis tool would typically flag the dual instantiations as an error, thinking that the user inadvertently loaded the same circuit twice, and would not allow the second instantiation. In a conventional system, the first and second instantiations would have the same circuit component, wiring, node, and register names and would not be accepted at place and route. Duplicating the source EDIF is done without having to re-synthesize the user design from the high-level circuit design language, which saves considerable simulation and design confirmation time. It also reduces complexity of the EDIF file, which reduces the chances for design errors ("bugs"), compared to an EDIF file synthesized from two VHDL user design circuit models.

A design tool according to an embodiment automatically produces two user designs EDIF files from the source EDIF file (i.e., EDIF file A and EDIF file B) (step 306). In a particular embodiment, the design tool renames the elements of the source EDIF file into two new lists (i.e., new names for each of the EDIF file elements, e.g., original_source_name_A and original_source_name_B). In an alternative embodiment, the design tool retains the original source EDIF file names and automatically generates a second EDIF with modified names. By giving the second instantiation of the user design a second set of names for the elements, the place and route tool can place both circuits in the IC without conflict; otherwise, the place and route tool might try to place or connect two different circuit components having the same name to a single physical resource of the IC. Similarly, the comparator used to compare the register pairs now has two uniquely named sets of registers to connect to.

The first user design EDIF file and the second user design EDIF file are merged (step 308). A comparator circuit and a re-loader circuit (logic) according to an embodiment is defined (step 310). In a particular embodiment, the comparator circuit and re-loader circuit are simple enough to be defined at the EDIF level without going through the high-level circuit design language and synthesis steps. For example, the comparator cone 102 and re-loader logic 114 of FIG. 1A is simple enough to be defined at the EDIF level ("comparator/re-loader EDIF file") after the dual modular redundancy design tool has generated the two sets of registers for the dual instantiations of the circuit design. Similarly, the multiplexers and logic operator of the comparator and re-loader circuit of FIG. 1B may also be defined at the EDIF level. In alternative embodiments, the comparator/re-loader is defined in a high-level device language and synthesized into a comparator/re-loader EDIF file. In a particular embodiment, the user circuit design has a set of registers that are duplicated in the two instantiations, and the comparator/re-loader circuit compares one register set against the other in a pair-wise fashion and indicates whether any pair of registers does not match. In another embodiment, the comparator/re-loader EDIF file is added to the merged dual modular EDIF file to produce the final EDIF file at step 312

The merged EDIF file of the first and second user design files and the comparator EDIF file are processed by a placer and router (place and route tool) (step 314) to place the elements of the EDIF files to physical resources of the IC. In the case where the IC is an FPGA or other programmable logic device ("PLD"), a configuration bitstream is produced (step 316). The IC is configured with the configuration file (step 318) using the first and second register sets of the first and second user design EDIF files to produce a dual modular redundant user application that includes the comparator for error capture.

In an alternative case where the IC is an ASIC, the place and route generates what is commonly called a "hard design" for the ASIC. The hard design is fabricated in the physical ASIC, and typically includes at least some memory elements (e.g., SRAM or other user-selectable elements) that are susceptible to event upsets. The nodes of the dual instantiations of the user design are compared as described above, and a mis-compare typically triggers a halt, reloading of the initial values (typically, but not necessarily, from an off-chip source) of the SRAM or other user-selectable elements, and the dual user designs are re-started or continued.

The configured IC simultaneously operates the first and second instantiations of the user design and compares registers of the first instantiation of the user design with corresponding registers of the second instantiation of the user design (i.e., register pairs). The IC is configured to halt the user designs and to re-load the first and second instantions of the user design if any of the register pairs do not match.

Figure 4:
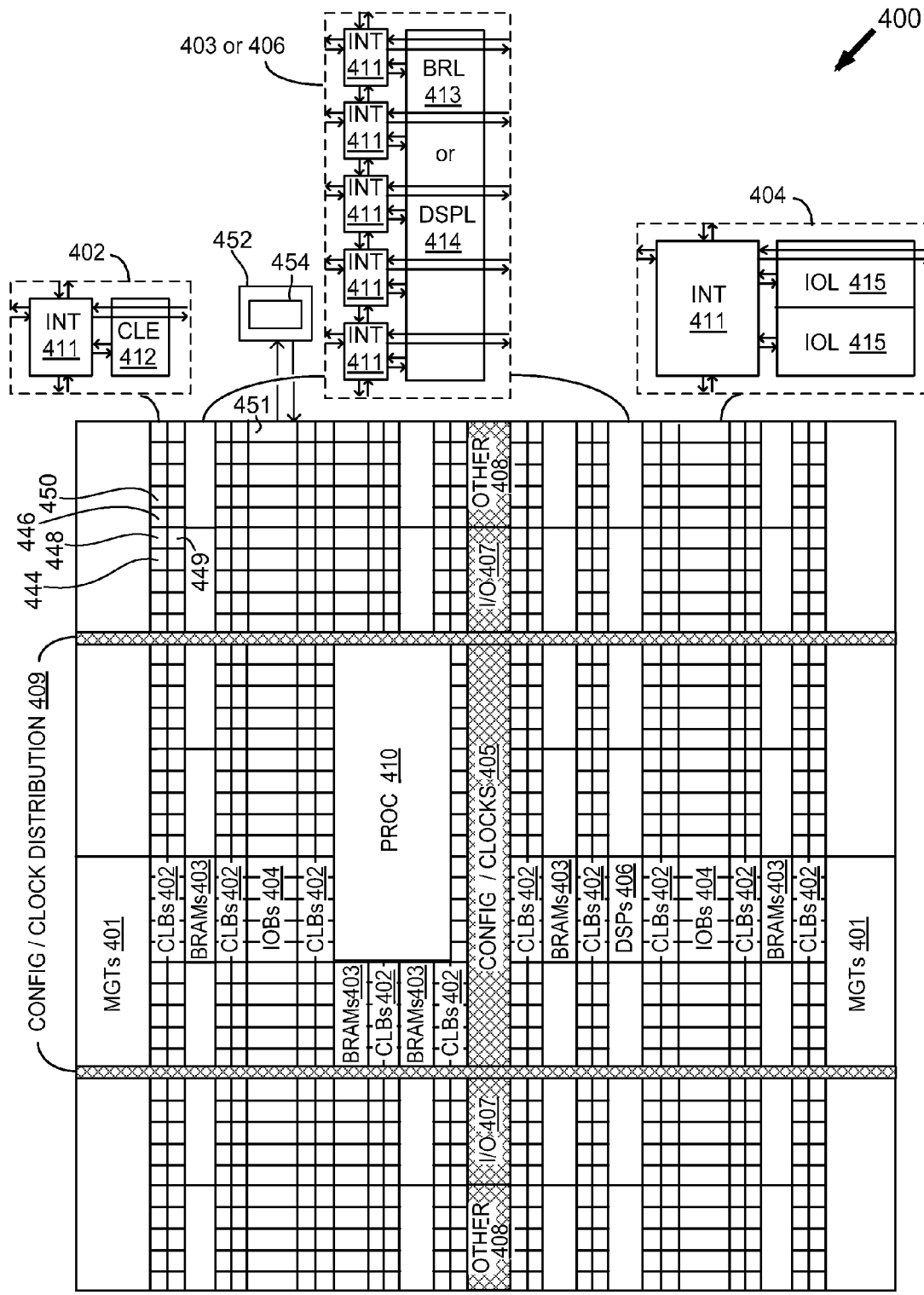
FIG. 4 is a plan view of an FPGA system with a soft error mitigation circuit according to an embodiment.

FIG. 4 is a plan view of an FPGA system with a soft error mitigation circuit according to an embodiment. The FPGA architecture 400 includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). In a particular embodiment, the FPGA 400 includes an internal configuration access port 451 that interfaces with a memory 452 storing a configuration bitstream 454, allowing selected portions of the FPGA to be re-loaded (re-configured) in response to on-chip logic (e.g., the comparator/re-loader circuit 448). As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Embodiments of the invention are incorporated in any of several portions of the FPGA 400. For example, a first instantiation of a user design 444, a second instantiation of a user design 446, and a register pair comparator/re-loader circuit 448 are configured in CLBs. In a particular embodiment, the FPGA 400 includes an ECC circuit 449 that identifies and corrects frame errors in the first and second instantiations of the user design 444, 446. In an alternative embodiment, both instantiations of the user design are configured in a single CLB, or a register pair comparator is configured in the same CLB as one or both of the instantiations of the user design. In a particular embodiment, the register pair comparator uses a comparator cone (see FIG. 1A) and halts operation of the user design within three clock cycles of the user design so as to halt the user design before mis-compared data is output from the FPGA. The FPGA 400 further includes a re-loader circuit 450 that reloads the first and second instantiations of the user design 444, 446 into the CLBs in response to a mis-compare, and then the user design is re-run and compared.

Figure 5:
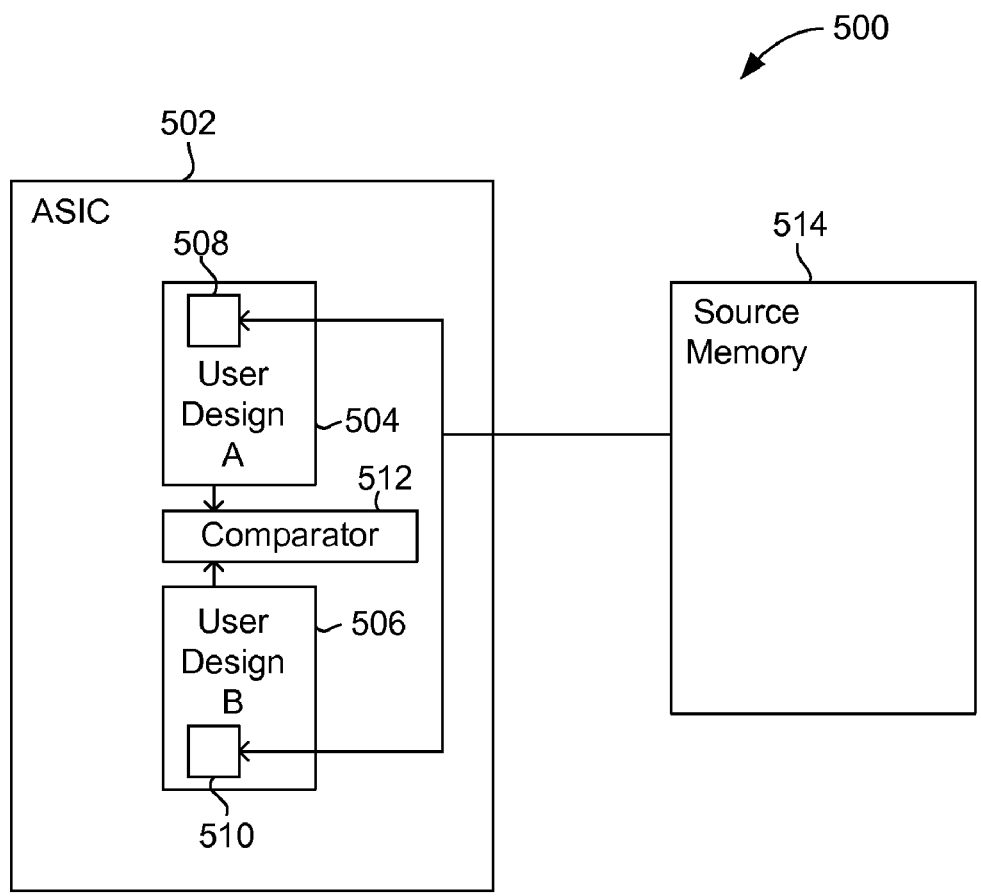
FIG. 5 is a plan view of an ASIC system with a soft error mitigation technique according to an embodiment.

FIG. 5 is a plan view of an ASIC system 500 with a soft error mitigation technique according to an embodiment. The system 500 includes an ASIC (chip) 502 with a first instantiation of a user design 504 and a second instantiation of the user design 506. Each of the first and second instantiations of the user design include elements susceptible to soft error upset 508, 510 (typically user-selectable/use settable element, e.g., SRAM). A soft error mitigation circuit 512 (e.g., a comparator/re-loader circuit) compares register pairs of the first and second instantiations of the user design and halts operation of the user design if a mis-compare occurs. The soft error mitigation circuit 510 then re-loads the initial values or conditions of the susceptible elements 508, 510 from memory 514 (e.g., a ROM or magnetic memory) to both instantiations of the user design, and re-starts the first and second instantiations of the user design circuits.

While the present invention has been described in connection with specific embodiments, variations of these embodiments will be obvious to those of ordinary skill in the art. Therefore, the spirit and scope of the appended claims should not be limited to the foregoing description.

What is claimed is:

1. An integrated circuit ("IC") comprising:
   a first instantiation of a user design configured in the integrated circuit including a first set of registers storing first values resulting from operating the first instantiation of the user design;
   a second instantiation of the user design configured in the integrated circuit including a second set of registers storing second values resulting from operating the second instantiation of the user design;
   a comparator having a comparator output, configured in the integrated circuit and coupled to the first and second sets of registers, wherein the comparator is configured and arranged to compare a value in each register in the first set of registers to a value in a corresponding register in the second set of registers; and
   a re-loader circuit configured in the integrated circuit and coupled to the comparator, the re-loader circuit configured and arranged to re-load at least a portion of the first instantiation of the user design or the second instantiation of the user design into the IC in response to the comparator indicating the value in any register of the first set does not match the value in the corresponding register of the second set.

2. The integrated circuit of claim 1 wherein the comparator is a comparator cone having a plurality of tiers of logic operators.

3. The integrated circuit of claim 2 wherein the comparator cone includes a first tier of exclusive-OR logic operators and at least one tier of OR logic operators.

4. The integrated circuit of claim 1 wherein the comparator includes a first multiplexer with a first multiplexer output, a second multiplexer output with a second multiplexer output, and an exclusive-OR logic operator comparing the first multiplexer output to the second multiplexer output.

5. The integrated circuit of claim 4 further comprising a latch between the exclusive-OR logic operator and the comparator output.

6. The integrated circuit of claim 1 wherein the integrated circuit is an application specific integrated circuit and the re-loader circuit is configured to re-load user-selectable elements of the first instantiation of the user design and of the second instantiation of the user design.

7. The integrated circuit of claim 1 wherein the re-loader circuit is configured to re-load each of the first instantiation of the user design and the second instantiation of the user design.

8. The integrated circuit of claim 7 wherein the re-loader circuit is further configured to re-start each of the first instantiation of the user design and the second instantiation of the user design after re-loading.

9. The integrated circuit of claim 1 wherein the integrated circuit is a field-programmable gate array integrated circuit having an on-chip error correction circuit and the re-loader circuit is configured to initiate on-chip error correction circuit in response to the comparator indicating the value in any register of the first set does not match the value in the corresponding register in the second set.

10. A method of operating a circuit configured in an integrated circuit comprising:
    concurrently operating a first instantiation of a user design configured in the integrated circuit to produce a first set of register values stored in a first set of registers and a second instantiation of the user design configured in the integrated circuit to produce a second set of register values stored in a second set of registers, each register of the first set of registers corresponding to a register of the second set of registers;
    comparing the value in each register of the first set of registers to the value in the corresponding register of the second set of registers;
    halting operation of the first instantiation of the user design and the second instantiation of the user design in response to the value in any register of the first set of registers not matching the value in the corresponding register of the second set of registers; and
    re-loading at least a portion of the first instantiation of the user design or the second instantiation of the user design into the integrated circuit after the halting operation.

11. The method of claim 10 further comprising, after the step of re-loading, continuing operation of the first instantiation of the user design and the second instantiation of the user design.

12. The method of claim 10 further comprising, after the step of re-loading, re-starting operation of the first instantiation of the user design and of the second instantiation of the user design.

13. The method of claim 12 further comprising, after re-starting operation of the first instantiation of the user design and of the second instantiation of the user design:
    concurrently operating a first re-loaded instantiation of the user design to produce a third set of register values stored in the first set of registers and the second instantiation of the user design to produce a fourth set of register values stored in the second set of registers;
    comparing the value in each register of the first set of registers to the value in the corresponding register of the second set of registers;
    halting operation of the first re-loaded instantiation of the user design and the second re-loaded instantiation of the user design in response to the value in any register of the first set of registers not matching the value in the corresponding register of the second set of registers; and
    outputting a hard error flag from the integrated circuit after the halting operation of the first re-loaded instantiation of the user design and the second re-loaded instantiation of the user design.

14. The method of claim 10 wherein the step of re-loading includes reloading the first instantiation of the user design and re-loading the second instantiation of the user design.

15. The method of claim 10 wherein the integrated circuit is a field-programmable gate array having an error correction circuit and wherein the step of re-loading includes operating the error correction circuit to identify and re-load at least one frame of the first instantiation of the user design or of the second instantiation of the user design.

16. The method of claim 10 wherein the step of comparing is completed within one clock cycle of the integrated circuit.

* * * * *